(12) United States Patent
Menon

(10) Patent No.: US 10,642,074 B2
(45) Date of Patent: May 5, 2020

(54) PHOTONIC MODULATOR STRUCTURES AND METHODS OF MANUFACTURE

(71) Applicant: University of Utah Research Foundation, Salt Lake City, UT (US)

(72) Inventor: Rajesh Menon, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 31 days.

(21) Appl. No.: 15/722,456

(22) Filed: Oct. 2, 2017

(65) Prior Publication Data

US 2018/0095300 A1  Apr. 5, 2018

Related U.S. Application Data

(60) Provisional application No. 62/402,597, filed on Sep. 30, 2016.

(51) Int. Cl.
*G02F 1/00* (2006.01)
*G02F 1/01* (2006.01)

(52) U.S. Cl.
CPC ............ *G02F 1/0054* (2013.01); *G02F 1/011* (2013.01); *G02F 1/0121* (2013.01); *G02F 2202/30* (2013.01)

(58) Field of Classification Search
CPC ...... G02F 1/0054; G02F 1/011; G02F 1/0121; G02F 2202/30
See application file for complete search history.

(56) References Cited

U.S. PATENT DOCUMENTS

| | | | |
|---|---|---|---|
| 4,435,732 A * | 3/1984 | Hyatt | B60R 16/0373 348/748 |
| 4,961,619 A | 10/1990 | Hernandez-Gil et al. | |
| 5,163,106 A | 11/1992 | Okayama et al. | |
| 6,061,487 A | 5/2000 | Toyama et al. | |
| 6,195,187 B1 | 2/2001 | Soref et al. | |
| 6,198,860 B1 | 3/2001 | Johnson et al. | |
| 7,272,275 B2 | 9/2007 | Spoonhower et al. | |
| 8,009,943 B2 | 8/2011 | Bratkovski et al. | |
| 8,107,149 B2 | 1/2012 | Wu et al. | |
| 8,466,370 B2 | 6/2013 | Lier | |

(Continued)

OTHER PUBLICATIONS

Andrew et al.; "Confining Light to Deep Subwavelength Dimensions to Enable Optical Nanopatterning"; Science; (May 15, 2009); pp. 917-921; vol. 324; <doi: 10.1126/science.1167704 >.

(Continued)

*Primary Examiner* — Thomas A Hollweg
*Assistant Examiner* — Mary A El-Shammaa
(74) *Attorney, Agent, or Firm* — Thorpe North & Western, LLP

(57) ABSTRACT

Metamaterial optical modulators can include one or more optical inputs, one or more optical outputs, one or more control inputs and an arrangement of a plurality of elements. The plurality of elements can include one or more variable state elements. The plurality of elements as arranged can be configured to modulate one or more properties of light passing through the metamaterial optical modulator via a change in a state of the one or more variable state elements based on one or more control signals received at the one or more control inputs.

29 Claims, 12 Drawing Sheets

(56) References Cited

U.S. PATENT DOCUMENTS

| | | | | |
|---|---|---|---|---|
| 8,655,189 | B2* | 2/2014 | Almassy | G02F 1/19 359/288 |
| 8,842,948 | B2 | 9/2014 | Mazumder et al. | |
| 9,031,362 | B2 | 5/2015 | Lipson et al. | |
| 2014/0043669 | A1* | 2/2014 | Bergh | G02F 1/0121 359/275 |
| 2015/0070745 | A1* | 3/2015 | Pradhan | E06B 9/24 359/275 |
| 2015/0370075 | A1* | 12/2015 | Ato | G02B 27/017 359/240 |
| 2016/0202590 | A1* | 7/2016 | Ziebarth | B60R 1/088 359/239 |
| 2017/0097553 | A1* | 4/2017 | Jack | G02F 1/163 |

OTHER PUBLICATIONS

Brimhall et al.; "Breaking the Far-Field Diffraction Limit in Optical Nanopatterning via Repeated Photochemical and Electrochemical Transitions in Photochromic Molecules"; Physical Review Letters; (Nov. 7, 2011); pp. 205501-205501-5; vol. 107; <doi: 10.1103/PhysRevLett.107.205501 >.

Cantu et al.; "Nanopatterning of diarylethene films via selective dissolution of one photoisomer"; Applied Physics Letters; (Oct. 24, 2013); pp. 173112-173114; vol. 103; <doi: 10.1063/1.4826925 >.

Giovampaola et al.; "Digital Metamaterials"; Nature Materials; (2014); 31 pages.

Johnson et al.; "Elimination of cross talk in waveguide intersections"; Optics Letters; (Dec. 1, 1998); pp. 1855-1857; vol. 23, No. 23.

Naik et al.; "Alternative Plasmonic Materials: Beyond Gold and Silver"; Advanced Materials; (2013); pp. 3264-3294; vol. 25; Purdue University; <doi: 10.1002/adma.201205076 >.

Pèrez et al.; "Multipurpose silicon photonics signal processor core"; Nature Communications; (Sep. 21, 2017); 9 pages; vol. 8, Articles No. 636; <doi: 10.1038/s41467-017-00714-1 >.

Pitchappa et al.; "Reconfigurable Digital Metamaterial for Dynamic Switching of Terahertz Anisotropy"; Advanced Optical Materials; (2015); 8 pages; <doi: 10 .1002/adom.201500588 >.

Shen et al.; "An integrated-nanophotonics polarization beamsplitter with 2.4×2.4 μm$^2$ footprint"; Nature Photonics Letters; (May 18, 2015); 5 pages; <doi: 10.1038/NPHOTON.2015.80 >.

Shen et al.; "Broadband asymmetric light transmission via all-dielectric digital metasurfaces"; Optics Express; (Aug. 10, 2015); pp. 20961-20970; vol. 23, No. 16; <doi: 10.1364/OE.23.020961 >.

Shen et al.; "Integrated digital metamaterials enables ultra-compact optical diodes"; Optics Express; (Apr. 20, 2015); pp. 10847-10855; vol. 23, No. 8; <doi: 10.1364/OE.23.010847 >.

Shen et al.; "Integrated metamaterials for efficient and compact free-space-to-waveguide coupling"; Optics Express; (Nov. 3, 2014); pp. 27175-27182; vol. 22, No. 22; <doi: 10.1364/OE.22.027175 >.

Shen et al.; "Metamaterial-waveguide bends with effective bend radius <$\lambda_0$/2"; Optics Letters; (Dec. 15, 2015); pp. 5750-5753; vol. 40, No. 24.

Shen et al.; "Ultra-high-efficiency metamaterial polarizer"; Optica; (Nov. 20, 2014); pp. 356-360; vol. 1, No. 5; <doi: http://dx.doi.org/10.1364/OPTICA.1.000356 >.

Wikipedia; "Photonic metamaterial"; (Bender the Bot ed.) (Sep. 24, 2016); 10 pages; [retrieved from <URL: https://en.wikipedia.org/w.index.php?title=Photonic_metamaterial&oldid=740944894 >].

Wipipedia; "Metameterial"; (78.210.78.35 (talk) ed.) (Sep. 17, 2016); 16 pages; [retrieved from <URL: https://en.wikipedia.org/w/index.php?title=Metamaterial&oldid=739851330 >].

* cited by examiner

PHOTONIC MODULATOR STRUCTURES AND METHODS OF MANUFACTURE

RELATED APPLICATION

The present application claims the benefit of U.S. Provisional Patent Application No. 62/402,597, filed Sep. 30, 2016, which is incorporated herein by reference.

GOVERNMENT INTEREST

None.

BACKGROUND

Optical switches and modulators are utilized in a number of fiber optic or integrated optical circuit (IOC) applications. Optical switches and modulators may be mechanically, electro-optically, or magneto-optically operated. As the scale of devices used in fiber optic circuits, integrated optical circuity and the like continue to decrease, there is a continuing need for improved optical switches and modulators.

SUMMARY

Embodiments of the present technology are directed toward photonic modulators and other similar photonic devices and method of manufacturing the same. The devices can include modulators, switches, multiplexers, demultiplexers, routers, waveguide-crossing arrays, and programmable photonic processor (PPP). A metamaterial optical modulator can comprise an optical input, an optical output, a control input; and an arrangement of a plurality of elements including one or more variable state elements. The plurality of elements as arranged are configured to modulate one or more properties of a light passing through the metamaterial optical modulator via a change in a state of the one or more variable state elements based on a control signal received at the control input.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1A:
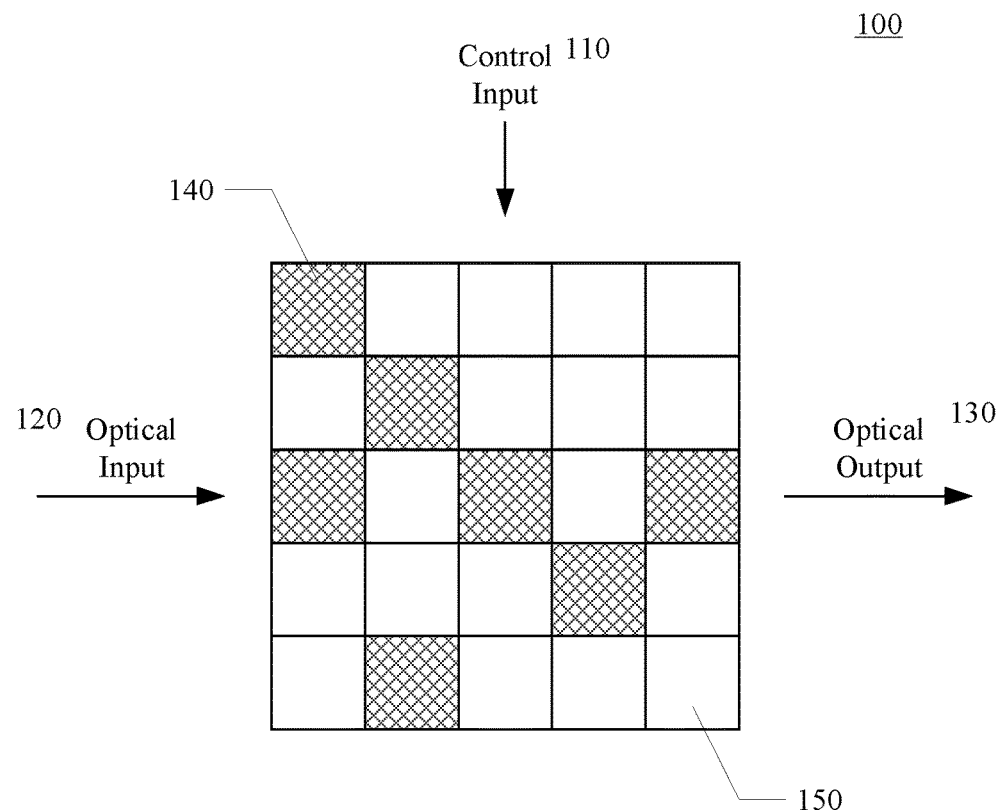
FIGS. 1A-1C illustrate a metamaterial optical modulator in accordance with an example.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The term "optical waveguide" as used herein refers to a physical structure that guides propagation of photons.

The term "optical modulator" as used herein refers to a device that is configured to vary one or more properties of a photon stream.

The term "photonic metamaterial" as used herein refers to a material having an arrangement of multiple elements at scales that are smaller than the wavelength of a photon stream and are arranged to influence properties of the photo stream.

The term "electrochromic" as used herein refers to a material that exhibits one or more properties that vary in response to electrical potentials. Typically, wavelength absorbance (e.g. color) of electrochromic materials varies upon exposure to varying electric potential.

The term "photochromic" as used herein refers to a material that exhibits one or more properties that vary in response to one or more properties of photons. Typically, photochromic materials can vary in wavelength absorbance or opacity upon exposure to light at particular frequencies.

The singular forms "a," "an," and "the" include plural referents unless the context clearly dictates otherwise. Thus, for example, reference to "a junction" includes reference to one or more of such features and reference to "subjecting" refers to one or more such steps.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, the term "about" is used to provide flexibility and imprecision associated with a given term, metric or value. The degree of flexibility for a particular variable can be readily determined by one skilled in the art. However, unless otherwise enunciated, the term "about" generally connotes flexibility of less than 5%, and most often less than 1%, and in some cases less than 0.01%.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of." For example, "at least one of A, B and C" explicitly includes only A, only B, only C, and combinations of each.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Embodiments of the present technology are directed toward metamaterial optical modulators. In one embodiment, the apparatus can include one or more optical inputs, one or more optical outputs, one or more control inputs and an arrangement of a plurality of elements. The plurality of elements can include one or more variable state elements. The plurality of elements as arranged can be configured to modulate one or more properties of light passing through the metamaterial optical modulator via a change in a state of the one or more variable state elements based on one or more control signals received at the one or more control inputs. The plurality of elements can be characterized by one or more dimensions that are smaller than the wavelength of the light. The change in the state of the one or more variable state elements can include one or more of the refractive index, the absorption, the reflectance, and/or the scattering property of the one or more variable state elements. The plurality of elements as arranged can modulate one or more of the amplitude, phase, polarization and/or direction of the light. The one or more control signals can include one or more optical control signals, one or more electrical control signals, one or more thermal control signals, and/or one or more acoustic control signals.

In another embodiment, a device can include a plurality of optical waveguides and a metamaterial optical modulator. The metamaterial optical modulator can include an arrangement of a plurality of elements including one or more variable state elements. The plurality of elements as arranged can be configured to modulate one or more properties of light via a change in a state of the one or more variable state elements based on one or more control signals. The one or more properties of the light can be modulated to transmit the light between one combination of the plurality of optical waveguides in a first state of the one or more variable state elements, and another combination of the plurality of optical waveguides in a second state of the one or more variable state elements.

In another embodiment, a method of manufacturing can include forming a non-variable state material on a substrate. The non-variable state material can be patterned to form a plurality of openings (e.g. optically transparent) in the non-variable state material having one or more dimensions that are smaller than a wavelength of light. A variable state material can be formed in the pattern of openings in the non-variable state material.

Embodiments of the present technology can be configured to allow one to interfere evanescent modes of light to achieve unique photonic functionality. Embodiments of the present technology may be adapted for use as optical modulators, optical switches, optical multiplexers, optical demultiplexers, routers, waveguide-crossing arrays, programmable photonic processor (PPP), combinations thereof, and other similar optical devices, and methods of manufacturing the same. For example, a PPP is generally comprised of a network of phase/amplitude modulators, whose modulation characteristics can be changed as needed. This represents the photonic analog of the field-programmable-gate array (FPGA) in electronics. There are many implementations of PPPs, but the most common one uses a Mach-Zehnder interferometer as more fully described in Perez et al., *Multipurpose silicon photonics signal processor core*, Nature Communications, 8:636 which is incorporated herein by reference.

Figures 1B, 1C:
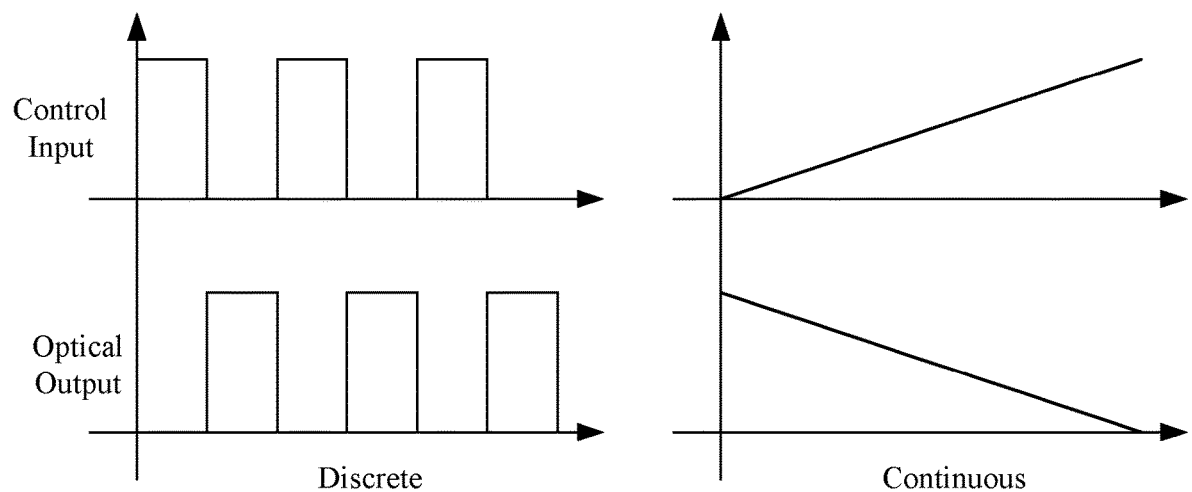

FIGS. 1A-1C illustrates a metamaterial optical modulator in accordance with an example. The metamaterial optical modulator 100 can include a control input 110, an optical input 120, and optical output 130, and an arrangement of a plurality of elements 140-150. The arrangement of the plurality of elements can include one or more variable state elements 140. In most cases the plurality of elements can include a plurality of variable state elements. The plurality of elements can also include one or more other elements 150. The arrangement of the plurality of elements 140-150 are configured to modulate one or more properties of a light passing from the optical input 120 to the optical output 130 via a change in the state of the variable state elements 140 in response to a control input signal received at the control input 110. The elements can typically be arranged in an array of discrete pixels having a defined dimension. In one alternative, the elements can have a square shape. Non-limiting examples of suitable element shapes can include, hexagonal, rectangular, triangular, or compound combinations of such shapes. Most often it can be desired to configure the array to have tiled elements in order to utilize substantially all space across the array.

In one aspect, the control input signal may include one or more of an optical, electrical, thermal, mechanical or acoustic control input signals. For example, the control input signal can be an optical signal switchable or variable between an on state and an off state. In another example, the control input signal can be an optical signal switchable between a first wavelength and a second wavelength. In yet another example, the control input signal can be a thermal signal switchable or variable between a first temperature and a second temperature. In yet another example, the control signal can be an electrical signal switchable or variable between a first potential voltage and a second potential voltage. Non-limiting examples of electrical switching materials can include silicon, doped silicon, GaAs, Ge, InP, GaInP, GaN, inorganic semiconductors, electrochromic materials, polyanylenes, and the like. Non-limiting examples of thermal switching materials can include intrinsic semiconductors that heat up by passing current (e.g. silicon based) or heat by applying infrared light. Non-limiting examples of mechanical switching elements can include MEM devices. In some cases a switching material can be switchable between only two states. However, in many cases, materials can pass through varying states through continuous or stepped modulation. For example, photochromic materials can attain different states between two refractive indices. Such materials allow analog modulation as opposed to digital modulation.

In one aspect, the plurality of elements 140-150 are characterized by one or more dimensions that are smaller than the wavelength of the light passing from the optical input 120 to the optical output 130. For example, an element may have a width and/or thickness that is less than half the wavelength of the light. As a general guideline, the elements can have a width from 1 nm to 10 μm, and often from 20 nm to 200 nm. Thicknesses of each element can also generally range from 10 nm to 5 μm. Generally, the signal and control input can be either in-plane or out of plane of the elements.

In one aspect, the arrangement of the plurality of elements 140-150 can modulate one or more of properties of the light, including the amplitude, intensity, brightness, phase, polarization, and direction of the light. One or more properties of the variable state elements 140 can change in response to the control input signal. For example, the refractive index, absorption, reflectance, scattering properties of the variable state elements 140 can change in response to the control input signal. The one or more properties of the variable state elements 140 can change between two or more discrete states, or through a continuum of a range of states in response to the control input. In addition, the variable state elements 140 can be collectively switchable or variable between two or more states, or can be individually switchable or variable between two or more states. Accordingly, one or more properties of the light passing from the optical input 120 to the optical output 130 can be modulated between two or more discrete states, or continuously through a range of states. For example, one or more properties of the light can be digitally modulated between a first state (e.g., off) when a control input is in a first state (e.g., on) and a second state (e.g., on) when the control input is in a second state (e.g., off), as illustrated in FIG. 1B. In another example, one or more properties of the light can be analog modulated across a continuum from a first extent of a state (e.g., high) when a control input is in a first extent of a state (e.g., low) through a second extent of a state (e.g., low) when the control input is in a second extent of a state (e.g., high), as illustrated in FIG. 1C.

In one aspect, the one or more variable state elements 140 can be a photochromic material, an electrochromic material, or the like. The one or more other elements 150 can have a state or one or more properties that do not vary in response to the control signal. For example, the one or more other elements 150 can be a cladding material or the like, such as silicon, glass, air, dielectric, plastic or the like. Furthermore, the arrangement of the plurality of elements can further include two or more sets of variable state elements. For example, the arrangement of the plurality of elements can include a first set of one or more variable state elements that can modulate a first property (e.g., amplitude) of the light, and a second set of one or more variable state elements that can modulate a second property (e.g., phase) of the light. The plurality of elements can be arranged in any two-dimensional (2D) space for 2D designs, or any three-dimensional (3D) for 3D designs. For example, a 3D arrangement can include multiple two-dimensional arrays (e.g. FIG. 1A) stacked adjacent to one another. In the case of a 3D configuration, the input and output signals can be perpendicular to the device.

Non-limiting examples of suitable photochromic materials can include diarylethenes, spirooxazines, azobenzenes, and the like. Typically, opacity transitions are between two isomeric states of a photochromic molecule such as cis versus trans configurations. Some non-limiting examples of classes of molecules for absorbance modulation include spiropyrans (including spirothiopyrans), spiro-oxazines, chromenes, fulgides, azobenzenes, diarylethenes, azo dyes, cyanine dyes, and viologens. Viologens transition via radical production which is different from isomerization processes. Spiropyrans exhibit transitions via ring opening mechanisms. Specific examples of suitable absorbance modulation materials can include polymers having azobenzene side-chains, furylfulgides, pyrrolfulgides, thiophene-substituted fluorinated cyclopentenes, and the like. Specific photochromic polymers can include, but are not limited to,

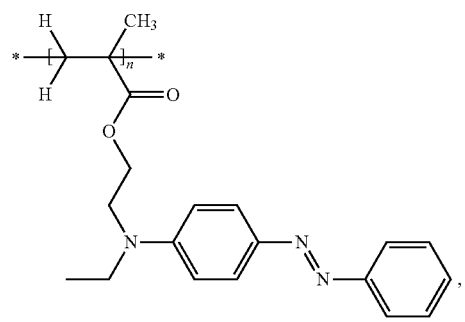

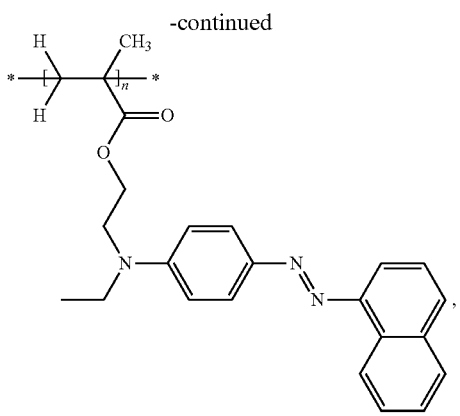

nitro derivatives thereof such as poly[(4-nitrophenyl)[4-[[2-(methacryloyoxy)ethyl]ethylamino]phenyl]diazene] and poly[(4-nitronaphthyl)[4-[[2-(methacryloyoxy)ethyl]ethylamino]phenyl]diazene],

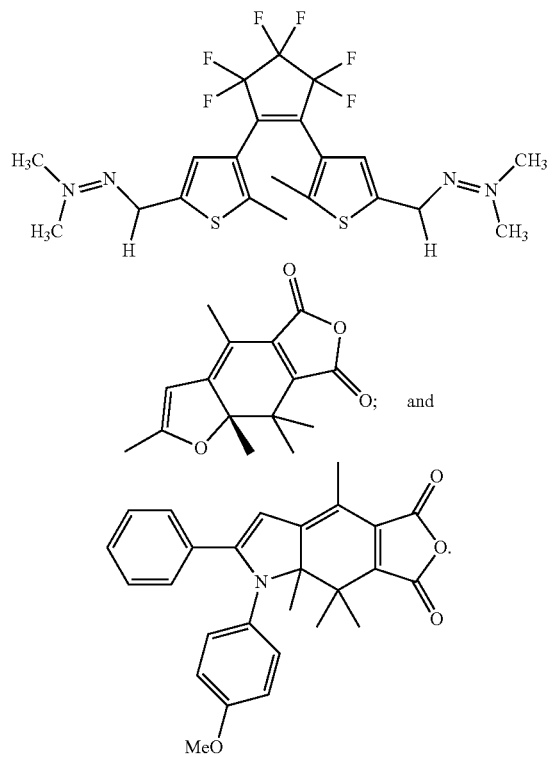

Other examples can include, but are not limited to, bithienylethene (BTE) with a photooxidant such as ruthenium tris(bipyridine) dichloride (Ru(bpy)$_3$Cl$_2$), ozone, trans-dioxo complexes of ruthenium and osmium, or metal nitride compounds; 1,2-bis(5,5'-dimethyl-2,2'-bithiophenyl) perfluorocyclopent-1-ene, solid-state materials such as photoactive metal oxides, saturable absorbers, laser-dye molecules, composites of the above materials, mixtures thereof, and the like. Despite enumeration of several specific photochromic materials, other photochromic materials can be used which exhibit the criteria set forth herein.

Figure 2A:
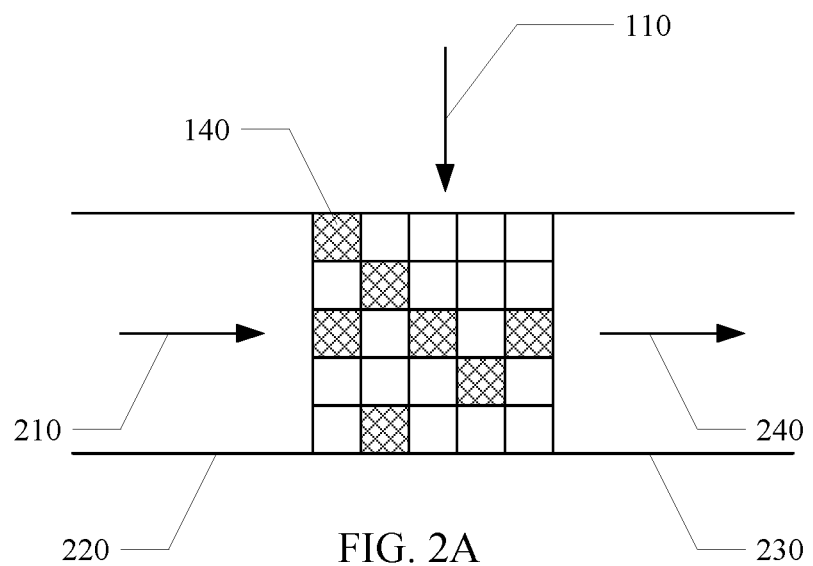
FIGS. 2A and 2B illustrate a metamaterial optical modulator in accordance with various example.
Figure 2B:
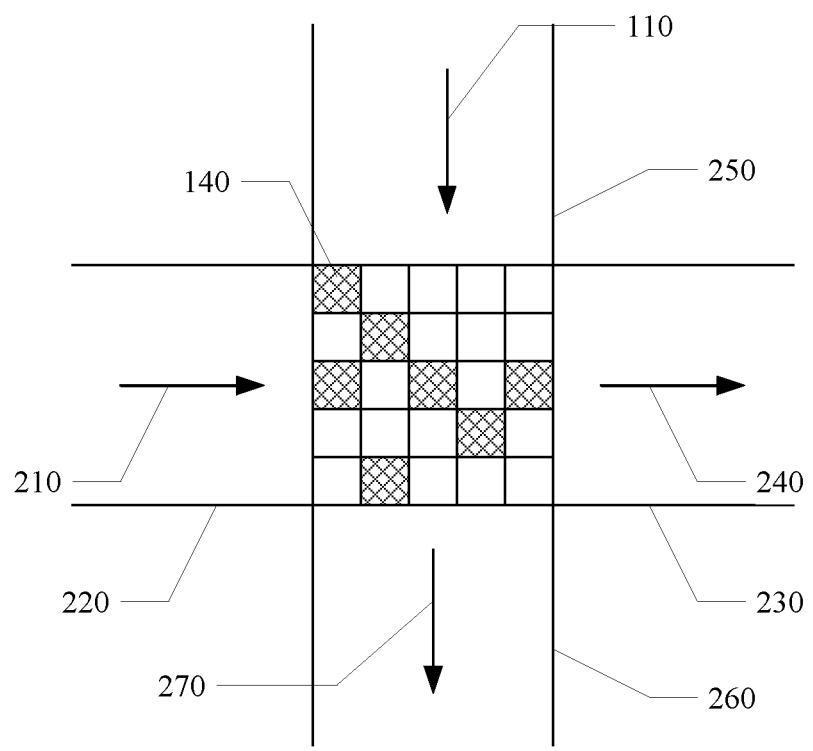

In one aspect, the metamaterial optical modulator can be used as a basic component of logic, communications, memory circuits, and the like. In particular, the metamaterial optical modulator can implement modulators, switches, multiplexers, demultiplexers and routers. Therefore, the term metamaterial optical modulator as used herein also includes metamaterial optical switches, metamaterial optical multiplexers, metamaterial optical demultiplexers, and metamaterial optical routers. FIGS. 2A and 2B illustrate a metamaterial optical modulator in accordance with various examples. As illustrated in FIG. 2A, a control signal can be coupled out-of-plane to a metamaterial optical modulator 100. An optical input signal 210 can be coupled to the metamaterial optical modulator 100 by a first waveguide 220. In one instance, when an optical control signal having a first wavelength ($\lambda_1$) is coupled to the metamaterial optical modulator 100, the optical input signal 210 can be coupled through the metamaterial optical modulator 100 to a second waveguide 230 as an optical output signal 240. When an optical control signal having a second wavelength ($\lambda_2$) is coupled to the metamaterial optical modulator 100, the optical input signal 210 is not coupled through the metamaterial optical modulator 100. In another instance, when an optical control signal of a given intensity is coupled to the metamaterial optical modulator 100, the optical input signal 210 can be coupled through the metamaterial optical modulator 100 to a second waveguide 230 as the optical output signal 240. When the optical control signal is turned off (e.g., substantially zero intensity), the optical input signal 210 is not coupled through the metamaterial optical modulator 100. Accordingly, the metamaterial optical modulator 100 can operate as a switch.

Although illustrated in FIG. 2B as in-plane, a control signal can be coupled out-of-plane to a metamaterial optical modulator 110. An optical input signal 210 can be coupled to the metamaterial optical modulator 100 by a first waveguide 220. In one instance, when an optical control signal is turned off (e.g., substantially zero intensity), the one or more variable state elements 140 can have a first state to enable the optical input signal 210 to be coupled through the metamaterial optical modulator 110 to a second waveguide 230 as an optical output signal 240. When an optical control signal having a first wavelength ($\lambda_1$) is coupled to the metamaterial optical modulator 110, the one or more variable state elements 140 can change to a second state to enable the optical input signal 210 to be coupled through the metamaterial optical modulator 100 to a third waveguide 250. In some cases the optical control signal can be global across the modulator. Alternatively, the optical control signal can be target to individual elements or subsets of elements within the plurality of elements. When an optical control signal having a second wavelength ($\lambda_2$) is coupled to the metamaterial optical modulator 110, the one or more variable state elements 140 can change to a third state to enable the optical input signal 210 to be coupled and directed through the metamaterial optical modulator 100 to a fourth waveguide 260 as a second optical output signal 270. Accordingly, the metamaterial optical modulator 100 can operate as three-way switch.

Figure 3A:
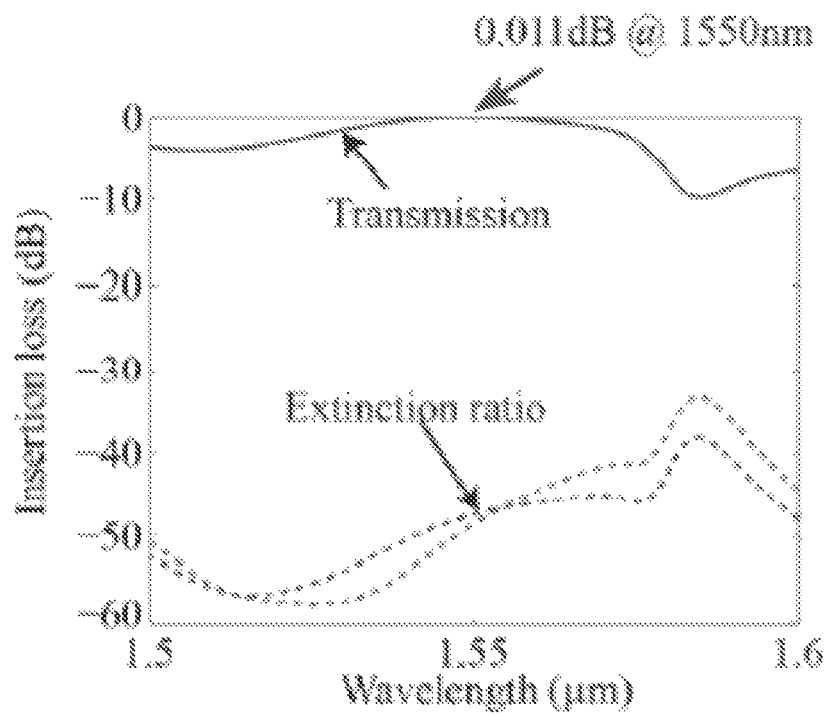
FIG. 3A shows a simulated transmission and cross talk spectra of a metamaterial optical modulator in accordance with an example.
Figure 3B:
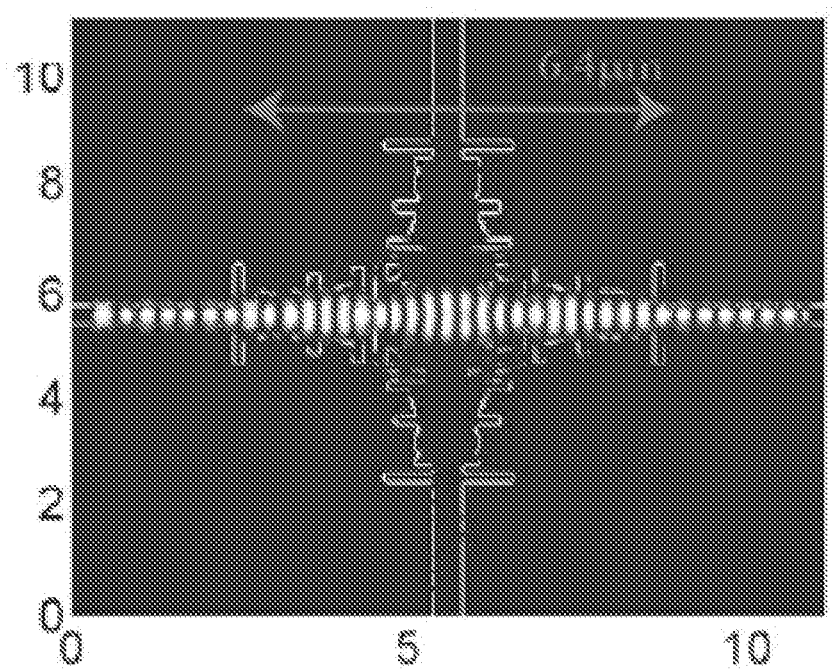
FIG. 3B is the layout of an example waveguide crossing using the digital metamaterial approach.

FIG. 3A shows a simulated transmission and cross talk spectra of a metamaterial optical modulator in accordance with the example illustrated in FIG. 2B. FIG. 3B shows an example geometry of the waveguide crossing illustrating transmission from the first waveguide 215 to the second waveguide 225 illustrated in FIG. 2B.

Figure 4A:
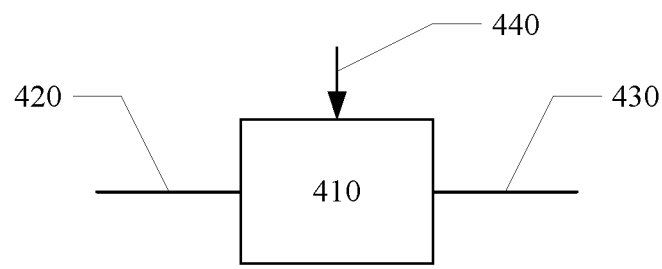
FIGS. 4A-4C illustrate a metamaterial optical modulator implementing various exemplary types of modulation.
Figure 4B:
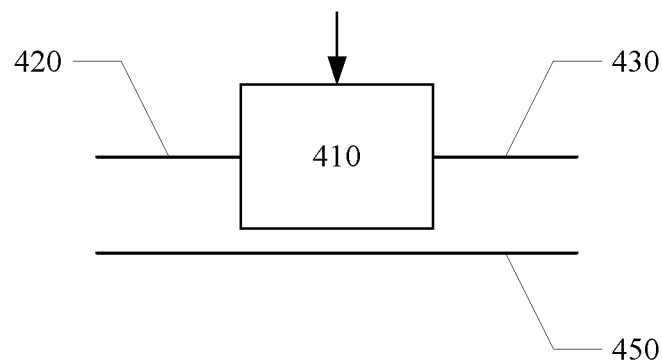
Figure 4C:
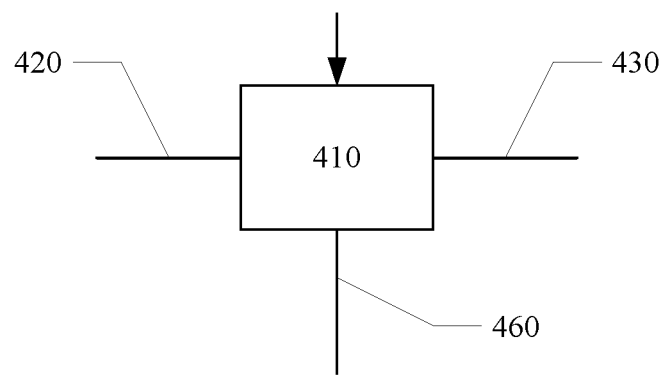

FIGS. 4A-4C illustrate a metamaterial optical modulator implementing various exemplary types of modulation. The metamaterial optical modulator 410 can include an arrangement of a plurality of elements including one or more variable state elements. The plurality of elements as arranged can be configured to modulate one or more properties of a light via a change in a state of the one or more variable state elements based on a control signal to transmit the light between one combination of the plurality of optical waveguides in a first state of the one or more variable state elements and another combination of the plurality of optical waveguides in a second state of the one or more variable state elements.

For example, as illustrated in FIG. 4A, the plurality of elements as arranged can be configured to modulate one or more properties of the light received on an input waveguide 420 for output on an output waveguide 430 based on a control signal 440. For instance, the amplitude, intensity, brightness or phase can be modulated based on an optical, electrical thermal, or acoustic control signal. In cases, such a modulating the amplitude, intensity, brightness or phase of light that are susceptible to absolute measurement, the metamaterial optical modulator 410 can be a single ended device.

In other case, the metamaterial optical modulator 410 can be a differential ended device, as illustrated in FIG. 4B. For example, the phase of the light received on the input waveguide 420 can be modulated for output on the output waveguide 430 relative to the received light or relative to a reference light 450.

In yet another case, the metamaterial optical modulator 420 can modulate one or more properties of the light for coupling between various waveguides, as illustrated in FIG. 4C. For example, the direction of the light received on the input waveguide 420 can be modulated by redirection for output on either a first or second output waveguide 430, 460.

Figure 5A:
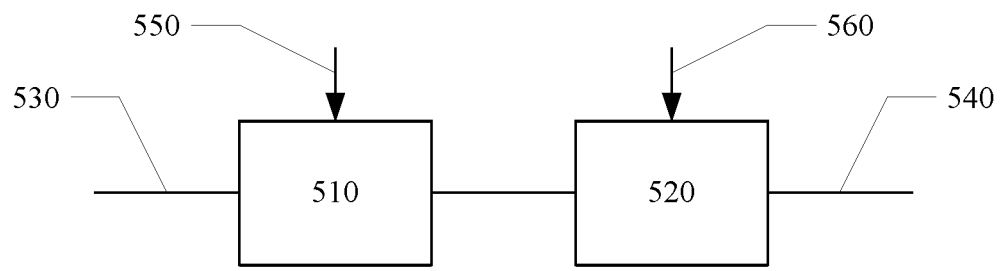
FIGS. 5A-5B illustrate one or more metamaterial optical modulators implementing various exemplary combinations of modulation.
Figure 5B:
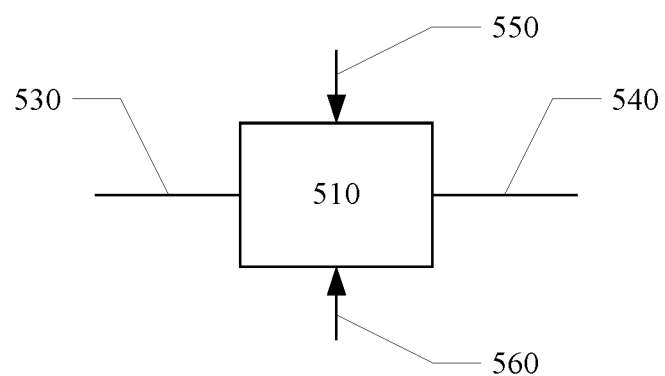

FIGS. 5A-5B illustrate one or more metamaterial optical modulators implementing various exemplary combinations of modulation. A plurality of metamaterial optical modulators 510, 520 may be coupled together to modulate two or more properties of light received on an input waveguide 530 for output on an output waveguide 540 based on respective control signals 550, 560, as illustrated in FIG. 5A. For instance, a first modulator 510 can modulate the amplitude of the light based on a first control signal 550 and second modulator 520 can modulate the phase of the amplitude modulate light based on a second control signal 560. Alternatively, a singular metamaterial optical modulator 510 can modulate two or more properties of the light, as illustrated in FIG. 5B. For instance, a singular modulator 510 can modulate both the amplitude of the light based on a first control signal 550 and the phase of the light based on a second control signal 560. In such case, The plurality of elements as arranged can be configured to modulate the amplitude of the light via a change in a state of a first set of one or more variable state elements based on the first control signal 550, and modulate the phase of the light via a change in a state of a second set of one or more variable state elements based on the second control signal 560.

FIGS. 6A-6D illustrate one or more metamaterial optical modulators implementing various exemplary circuits. As illustrated, a plurality of elements as arranged can be configured to modulate one or more properties of a light via a change in a state of the one or more variable state elements based on a control signal to transmit the light between one combination of the plurality of optical waveguides in a first state of the one or more variable elements and another combination of the plurality of optical waveguides in a second state of the one or more variable elements.

Figure 6A:
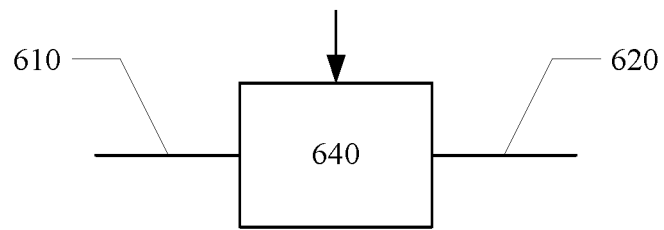
FIGS. 6A-6D illustrate one or more metamaterial optical modulators implementing various exemplary circuits.
Figure 6B:
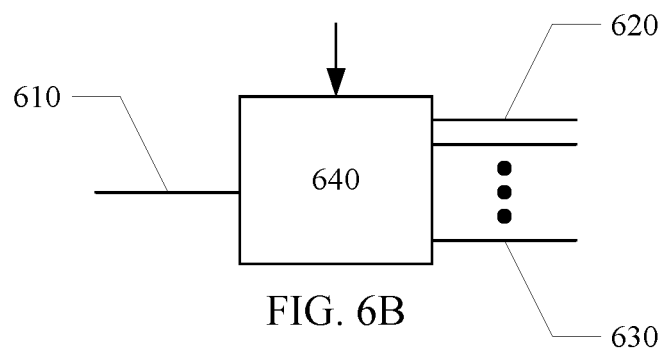

For example, one or more properties of the light can be modulated to transmit the light from an input waveguide 610 to an output waveguides 620, as illustrated in FIG. 6A. In another example, one or more properties of the light can be modulated to transmit the light from an input waveguide 610 to one or more of a plurality of output waveguides 620, 630, as illustrated in FIG. 6B. For instance, a demultiplexer or router can be implemented by a metamaterial optical modulator 640 configured to modulate the direction of the light to transmit the light from the input waveguide 610 to one of the plurality of output waveguides 620, 630. In another instance, a demultiplexer or router can be implemented by a metamaterial optical modulator 640 configured to modulate the direction of the light to transmit the light from the input waveguide 610 to one of the plurality of output waveguides 620, 630, or even two or more of the plurality of output waveguides 620, 630.

Figure 6C:
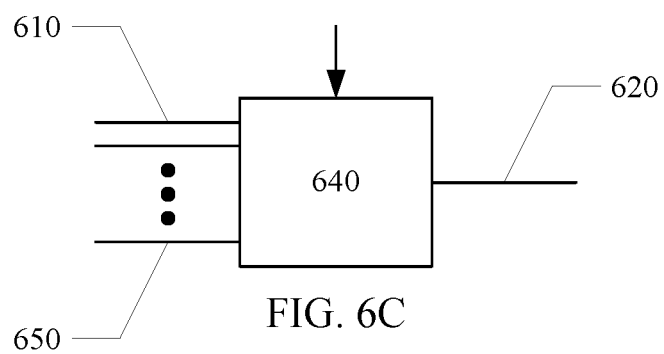
Figure 6D:
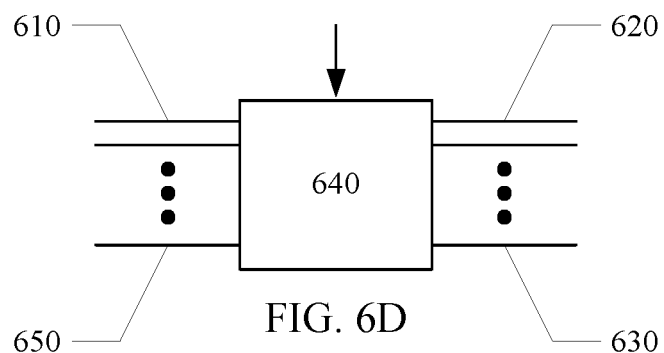

In another example, one or more properties of the light can be modulated to transmit the light from one or more of a plurality of input waveguides 610, 650, to an output waveguide 620, as illustrated in FIG. 6C. For instance, a multiplexer or router can be implemented by a metamaterial optical modulator 640 configured to modulate the direction of light to transmit light from one of a plurality of the input waveguides 610, 650 to an output waveguide 620. In another instance, the metamaterial optical modulator 640 can be configured to modulate the direction of light to transmit light from two or more input waveguides 610, 650 to the output waveguide 620. In yet another example, one or more properties of the light can be modulated to transmit light from one or more of a plurality of input waveguides 610, 650 to one or more of a plurality of output waveguides 620, 630, at illustrated in FIG. 6D. For instance, a router can be implemented by a metamaterial optical modulator 640 configured to modulate the direction of light to transmit light from one of the plurality of input waveguides 610, 650 to one of the plurality of output waveguides 620, 630. In yet another instance, the metamaterial optical modulator 640 can be configured to modulate the direction of light to transmit light from two or more input waveguides 610, 650 to one of the output waveguides 620, 630, from one of the input waveguide 610, 650 to two or more of the output waveguide 620, 630, or even from two or more of the input waveguides 610, 650 to two or more of the output waveguides 620, 630.

Figure 7:
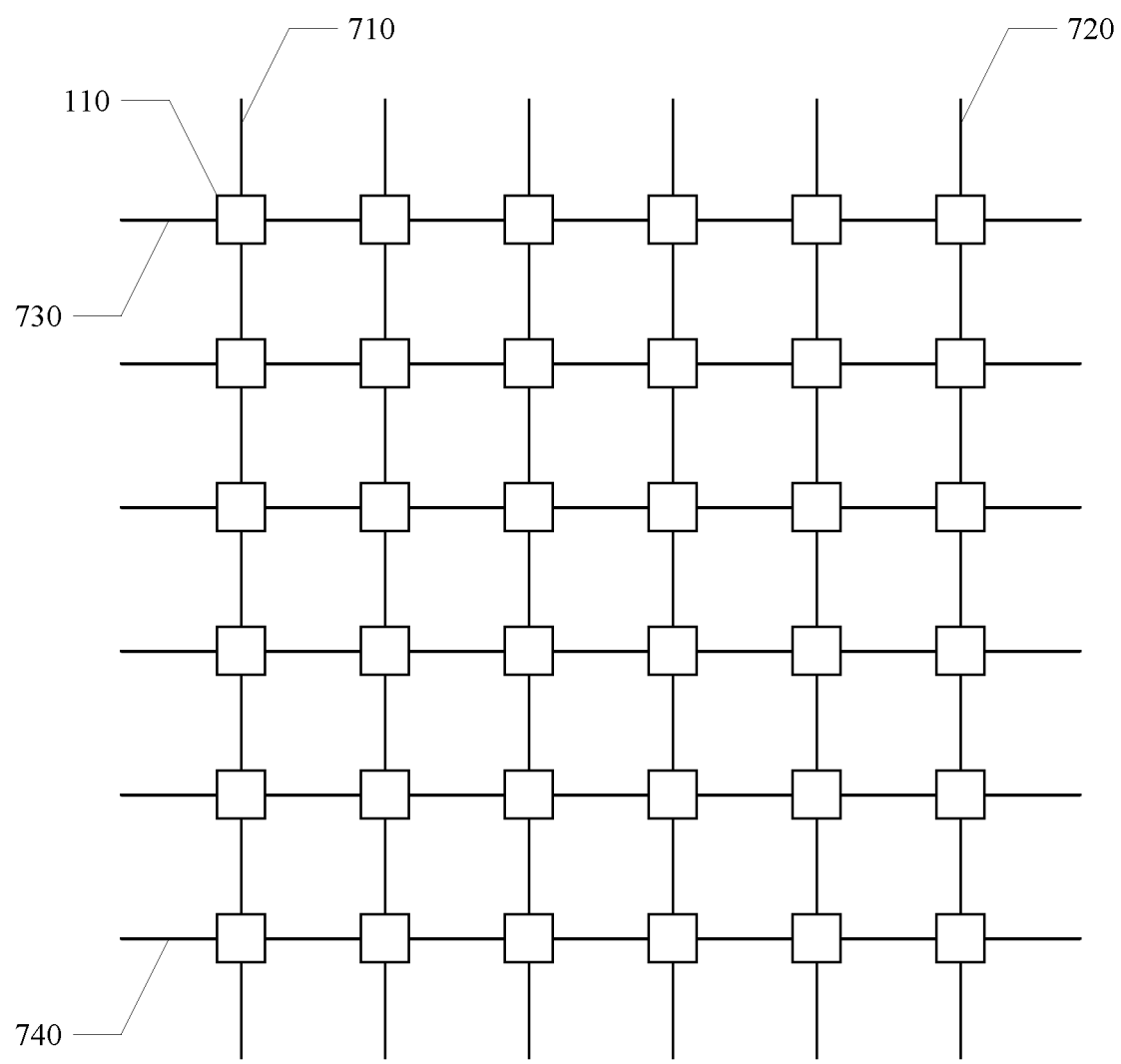
FIG. 7 illustrates a plurality of metamaterial optical modulators arranged in an exemplary modulator array.

FIG. 7 illustrates a plurality of metamaterial optical modulators arranged in an exemplary modulator array. A waveguide-crossing array can include a first set of optical waveguides 710, 720, a second set of optical waveguides 730, 740, and a plurality of metamaterial optical modulators 110 interposed at intersections of waveguides. The metamaterial optical modulators 110 can be disposed at different crossings between optical waveguides in the first set 710, 720 and optical waveguides in the second set 730, 740. In one instance, the metamaterial optical modulators 110 can be disposed at all the crossings, as illustrated. In another instance, the metamaterial optical modulators 110 can be disposed at a subset of predetermined crossings such that complex modulator arrays can be formed. The metamaterial optical modulators 710 can each comprise an arrangement of a plurality of elements including one or more variable state elements. The plurality of elements, of a first modulator 110, as arranged can be configured to modulate one or more properties of a light via a change in a state of the one or more variable state elements based on a control signal to transmit light between a first optical waveguide 730 and a second optical waveguide 710. The waveguide-crossing array, in one example, can be utilized in the implementation of a Programmable Photonic Processor (PPP). The programmable photonic processor can also utilized other implementation of the metamaterial optical modulators described herein, such as the modulators, switches, multiplexers, demultiplexers and routers. In one instance, a PPP can include a network of phase/amplitude modulators, whose modulation characteristics can be changed as needed. In contrast, other PPPs commonly use a Mach-Zehnder interferometer.

Figure 8:
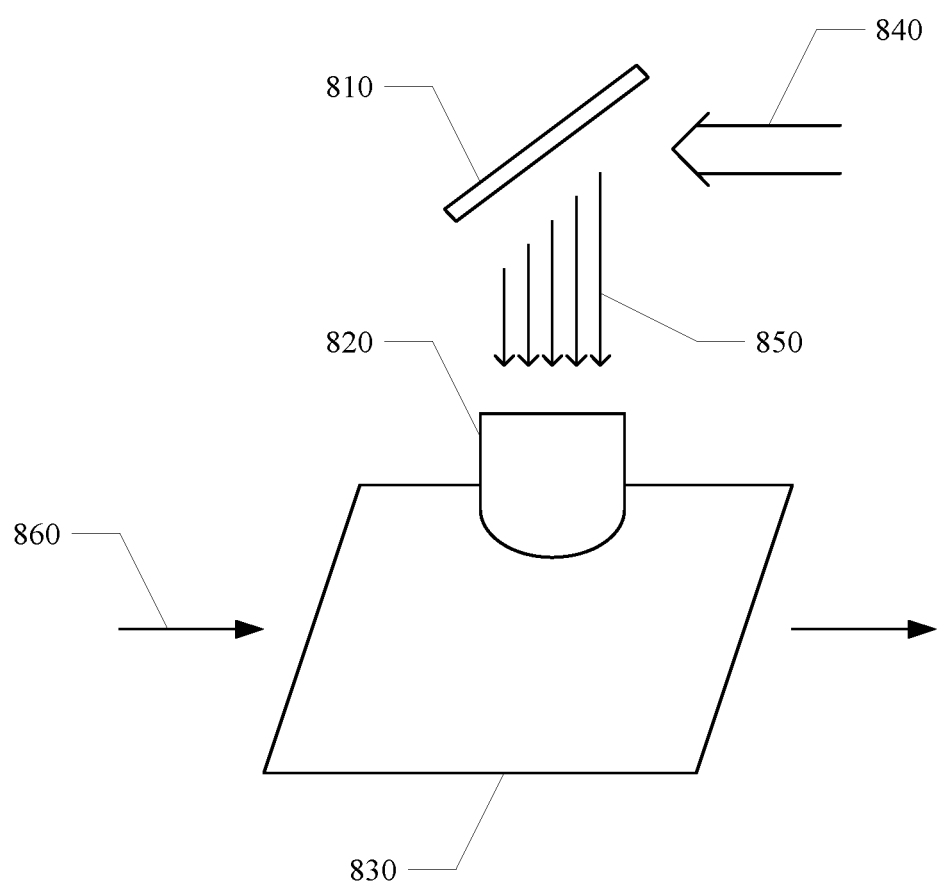
FIG. 8 illustrates an apparatus including a plurality of metamaterial optical modulators in accordance with an example.

FIG. 8 illustrates an apparatus including a plurality of metamaterial optical modulators in accordance with an example. The apparatus includes a spatial-light modulator (SLM) 810, a lens 820, and a plurality of metamaterial optical modulators within a modulator array 830. The spatial-light modulator 810 can be configured to convert one or more incident beams 840 into set of one or more independent beamlets 850. For example, a first incident beam of a first wavelength ($\lambda_1$) can be split into a first set of beamlets, and a second incident beam of a second wavelength ($\lambda_2$) can be split into a second set of beamlets. The spatial-light modulator 810 can be reflective (as illustrated in FIG. 8) or transmissive. The spatial-light modulator 810 can control the intensity and/or phase of each independent beamlet 850. The spatial-light modulator 810 in cooperation with the lens 820 can direct and focus one or more of the independent beamlets 850 on respective metamaterial optical modulators within the array 830 as one or more independent control input signals. In one example, the lens 830 can be a de-magnifying objective lens configured to match the width of the beamlets to the pitch of the metamaterial optical modulators.

The independent control input signals can be configured to control modulation of an optical input signal 860 at respective metamaterial optical modulators. For example, a first control input signal of wavelength ($\lambda_1$) from the first set of beamlets can be used to switch light in a first direction, while a second control input signal of wavelength ($\lambda_2$) from the second set of beamlets can be used to switch light in a second direction.

An advantage of the above described apparatus is that a large array of metamaterial optical modulator cells can be realized on an integrated circuit (IC) die. For example, if each metamaterial optical modulator cell is an apparatus on a 5 µm by 5 µm, an IC die can fit about 200×200=40,000 metamaterial optical modulator cells in a 1 mm by 1 mm area. In another example, a 20 mm by 20 mm area of an IC die can fit 4000×4000=16 million metamaterial optical modulator cells. As a general guideline, each modulator can have a size from about 5 nm to 10 µm, and often from 25 nm to 5 µm. Similarly the number of elements within each modulator can vary depending on the design. However, the number of elements (e.g. pixels) can be varied from about 25 to about 80,000 and most often from 100 to 40,000.

Figure 9A:
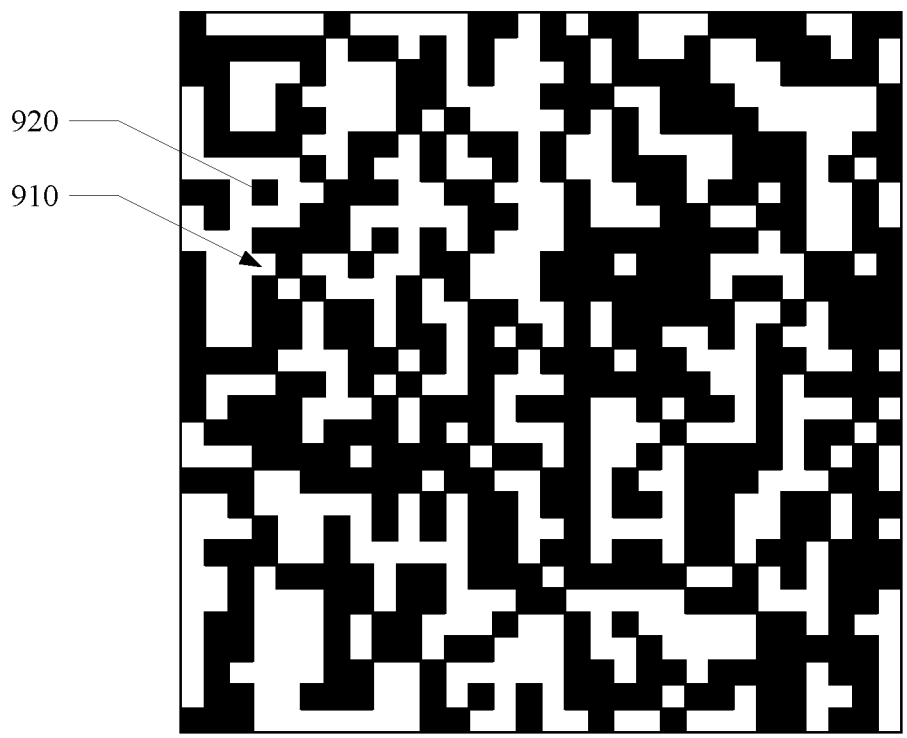
FIGS. 9A and 9B illustrate a metamaterial optical modulator in accordance with an example.
Figure 9B:
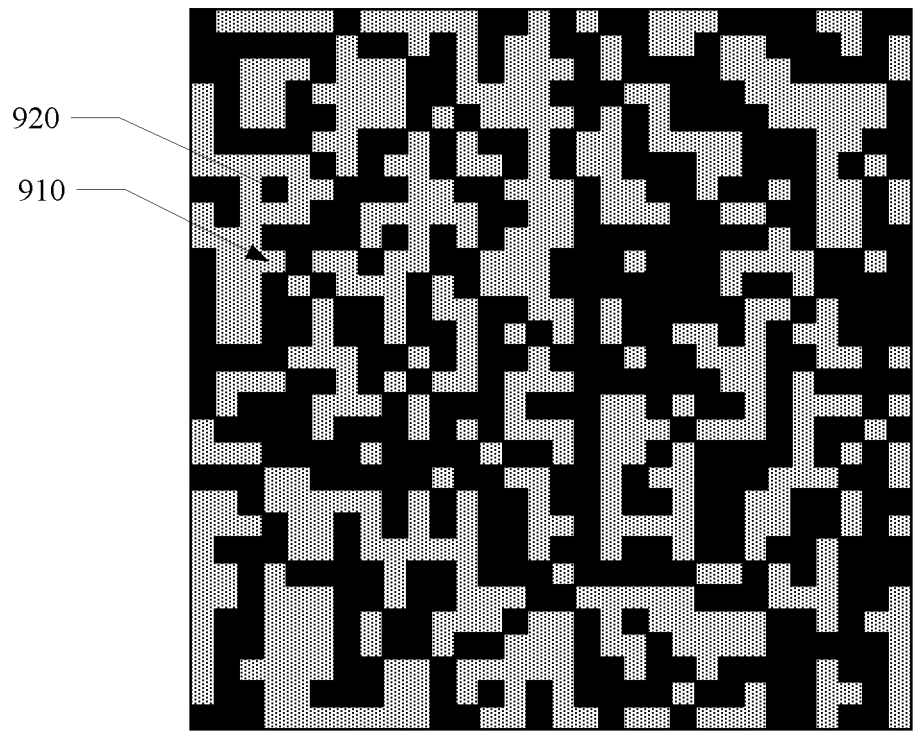

FIGS. 9A and 9B illustrate a metamaterial optical modulator in accordance with an example. The metamaterial optical modulator can include an arrangement of a plurality of variable state elements 910 and non-variable state elements 920. In one instance, the variable state elements 910 can have a first state visually represented in FIG. 9A, and can have a second state as visually represented in FIG. 9B. A topologic distribution of variable state elements and non-variable state elements can be selected using a multi-state topological algorithm with a goal to maximize a predetermined figure of merit. In one example, the predetermined figure of merit can be an extinction ratio, which can be specified as a difference bin transmission between an on state and an off state of the metamaterial optical modulator. The multi-state topological algorithm can work using an ensemble effect, with a particular arrangement of element. Indeed, more than one element arrangement solution can be possible with the metamaterial optical modulator open to variable tuning in order to mitigate insertion loss or maximize different parameters such as transmission efficiency, extinction ratio, or the like. In some examples, the figure of merit can be averaged over an operating bandwidth.

In one example, a device region of 3 µm by 3 µm can be divided into 30×30 elements, each of size 100 nm×100 nm. Each element can be either a photochromic element or a silicon element. Light of a transverse-electric (TE) polarization can be coupled into and out of the metamaterial optical modulator via single-mode waveguides. The elements can have the ability to reversibly transition between to isomeric states with different molecular structures based on the wavelength of the photons absorbed by each state. Out-of-plane illumination at two wavelengths can be used to induce that state change of the photochromatic elements. When the modulator is illuminated with light having a wavelength of about 300 nm, the photochromatic elements can switch from an open ring state to a closed ring state, and the metamaterial optical modulator enables transmission of the light from the input waveguide to the output waveguide. On the other hand, when the modulator is illuminated with light having a wavelength of about 633 nm, the photochromatic elements undergo the opposite transformation. The modified refractive-index distribution result in low transmission of light from the input to the output waveguides. In each state, coupled resonant modes can be excited by the incident light, which either results in relatively high or low transmission to the output waveguide depending upon the refractive-index distribution. The photochromatic elements may be of the diarylethene family, which can switch state in the time scale of picoseconds. The photochromes tend to be low-density, soft molecular materials with widely adaptable processing requirement and can be readily introduced into a CMOS device fabrication stack at any point of a process flow. Simulations indicate that the metamaterial optical modulator can provide about a 9.5 dB extinction ratio with a bandwidth of about 10 nm, centered at 1.55 µm, corresponding to an extinction ratio per device length of 3.2 dB/µm.

In another example, the variable state elements can be pn-junction elements. When the pn-junction is forward biased, majority carriers from one side are injected to the other side. This significant increase in carrier concentration (which are the minority carriers in the side into which they are injected) can change the refractive index enough.

Figure 10:
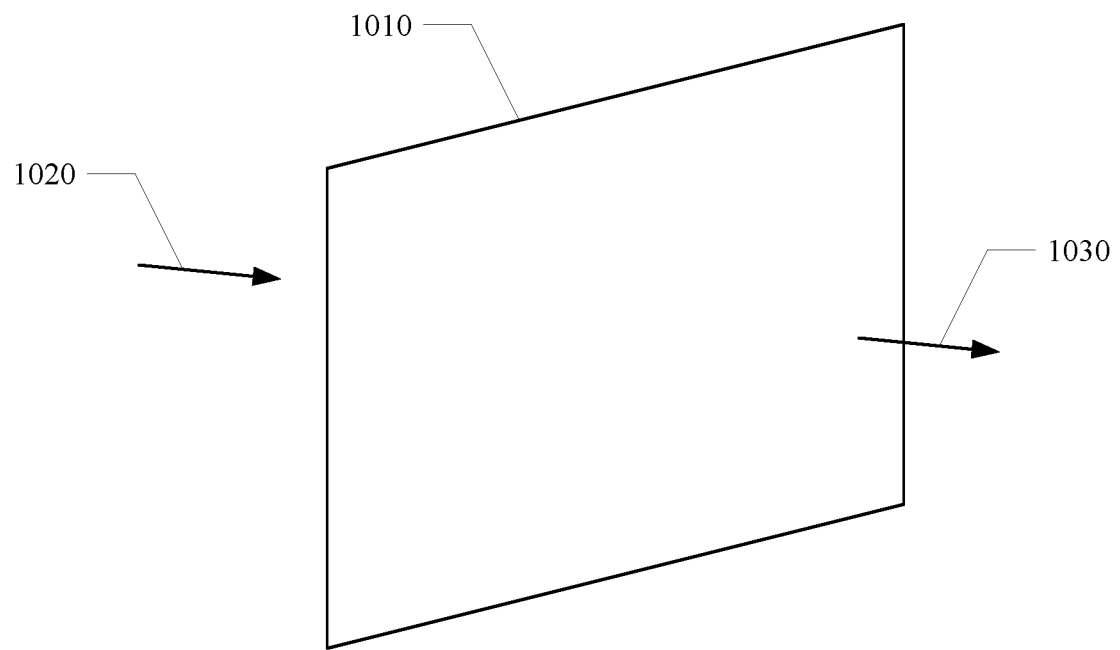
FIG. 10 illustrates an apparatus including one or more metamaterial optical modulators in accordance with an example.

FIG. 10 illustrates an apparatus including one or more metamaterial optical modulators in accordance with an example. The apparatus may include a metasurface 1010 including one or more metamaterial optical modulators. The metasurface 1010 in one instance can be modulated so as to select a specific polarization from input light 1020 and output the selected polarization of light 1030. In other instances, the metasurface 1010 can select a certain direction of propagation (e.g., spatial frequency), or certain wavelength, or other property of light or any combination of properties. In yet another instance, the metasurface 1010 can be used as a spatial light modulator, wherein the input light 1020 can be a single beam or an array of beamlets and the output light 1030 can include a plurality of spatially separated beamlets. In yet another instance, the metasurface 1010 can be modulated as a switch as well. For example, the metasurface 1010 can act as a programmable window that can allow light to pass in one state and not in the other state.

Figure 11A:
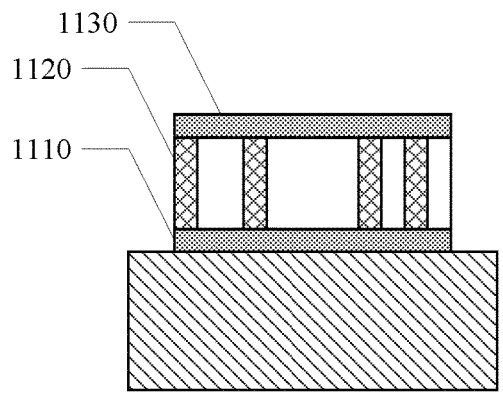
FIGS. 11A-11D illustrate various exemplary architectures that can be utilized to couple an input control signal to the metamaterial optical modulator.
Figure 11B:
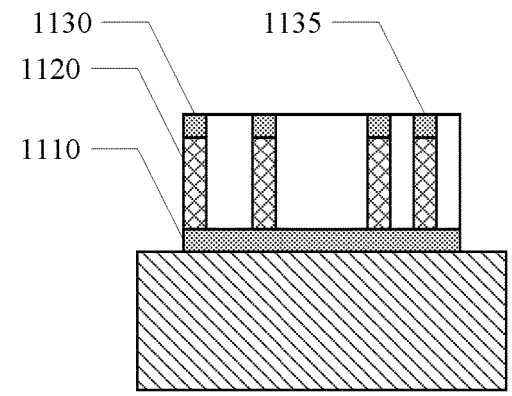
Figure 11C:
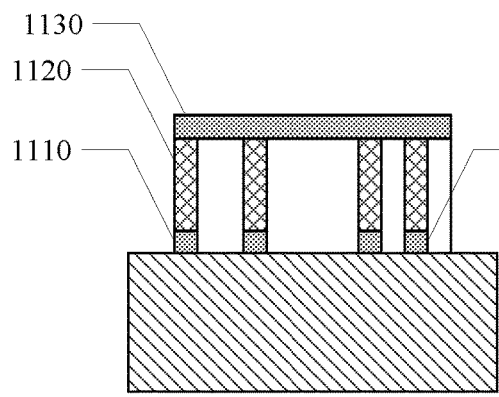
Figure 11D:
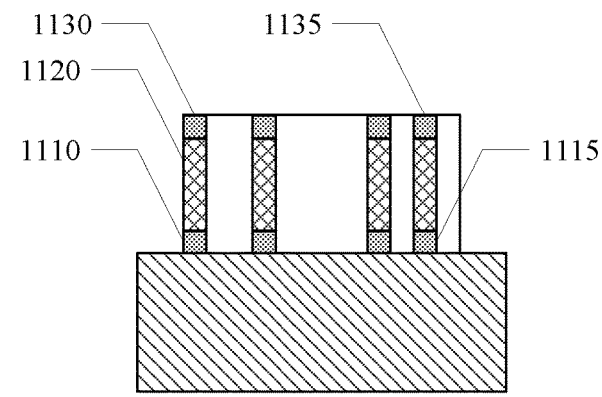

FIGS. 11A-11D illustrate various exemplary architectures that can be utilized to couple an input control signal to the metamaterial optical modulator. These are not to be construed to be limiting in any manner. For example, in a metamaterial optical modulator a plurality of electrochromic elements can be utilized. In one instance, a first electrode 1110 can be coupled to a first side of the plurality of electrochromic elements 1120, and a second electrode 1130 can be coupled to a second side of the plurality of electrochromic elements 1120 opposite the first side, as illustrated in FIG. 11A. In such case the electrochromic elements can collectively change state based on a control signal applied between the electrodes 1110, 1130. In another example, a first electrode 1110 can be coupled to a first side, and a plurality of second electrodes 1130, 1135 can be coupled to a second side of respective ones of the plurality of electrochromic elements 1120 opposite the first side, as illustrated in FIG. 11B. Similarly, in another example, a plurality of first electrodes 1110, 1115 can be coupled to a first side of respective ones of the plurality of electrochromic elements 1120, and a second electrode 1130 can be coupled to a second side of the plurality of electrochromic elements 1120 opposite the first side, as illustrated in FIG. 11C. In yet another instance, a plurality of first electrodes 1110, 1115 can be coupled to a first side of respective ones of the plurality of electrochromic elements 1120, and a plurality of a second electrode 1130, 1135 can be coupled to a second side of respective ones of the plurality of electrochromic elements 1120 opposite the first side, as illustrated in FIG. 11D. In such cases, one or more of the variable state elements can individually change state based on a control signal applied across the terminal of the respective variable state element.

Figure 12A:
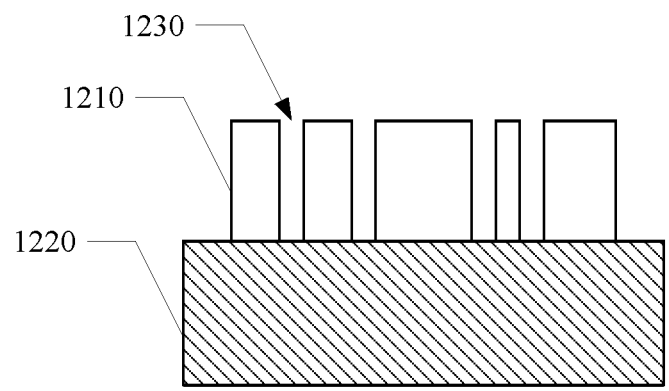
FIGS. 12A-12C illustrate a method of manufacturing a metamaterial optical modulator in accordance with an example.
Figure 12B:
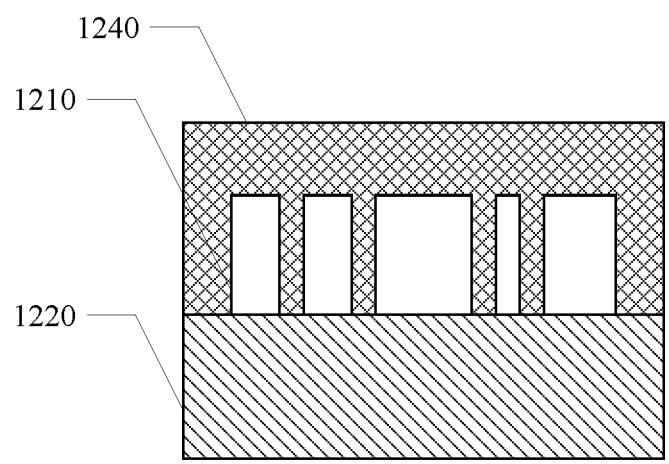
Figure 12C:
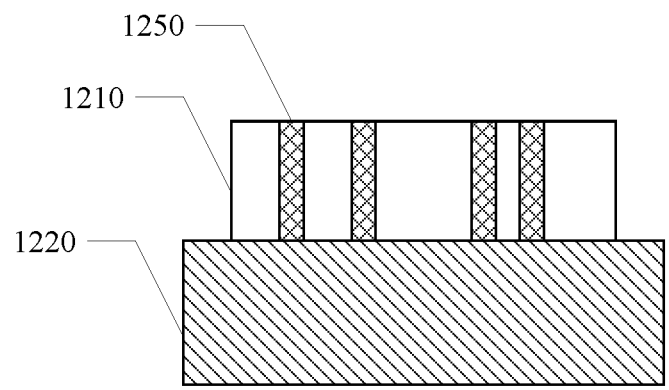

FIGS. 12A-12C illustrate a method of manufacturing a metamaterial optical modulator in accordance with an example. The method of manufacture can include forming a non-variable state material 1210 on a substrate 1220. The non-variable state material 1210 can be formed by depositing a silicon dioxide layer on a silicon substrate 1220. The non-variable state material 1210 can be patterned to form a plurality of opening 1230 in the non-variable state material. The openings 1230 can correspond to a determined arrangement of variable state elements. The openings 1230 and/or the spacing of the pattern or openings 1230 can have one or more dimension on the order of nanometers (nm). In one instance, the opening 1230 can be formed by selectively etching or milling the silicon dioxide layer. A variable state material 1240 can be formed in the plurality of openings 1230 in the non-variable state material 1210. In one instance, the variable state material 1240 can be a photochrome that is deposited on the silicon oxide layer and in the openings therein and then etched back so that the photochrome remains in the openings to form a pattern of a plurality of photochrome elements 1250. The photochrome can be deposited by spin-casting, evaporation, sputtering, dip casting, or the like. The photochrome can be etched back by isomer-selective dissolution, or the like.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A metamaterial optical modulator comprising:
   an optical input;
   an optical output;
   a control input; and
   an arrangement of a plurality of elements including one or more variable state elements, wherein the plurality of elements as arranged are optical elements configured to modulate one or more properties of a light passing from the optical input to the optical output through the metamaterial optical modulator via a change in a state of the one or more variable state elements based on a control signal received at the control input, wherein the arrangement of the plurality of elements is an array of discrete pixels having a defined dimension, and the one or more properties of the light include one or more of an amplitude, a phase, a polarization or a direction of the light.

2. The metamaterial optical modulator of claim 1, wherein the plurality of elements also include one or more other elements having a state or one or more properties that do not vary in response to the control signal.

3. The metamaterial optical modulator of claim 1, wherein the one or more properties of the light modulated by the plurality of elements as arranged further include one or more of an intensity, or a brightness.

4. The metamaterial optical modulator of claim 1, wherein the plurality of elements are characterized by one or more dimensions that are smaller than a wavelength of the light.

5. The metamaterial optical modulator of claim 1, wherein the control signal includes an optical control signal, an electrical control signal, a thermal control signal, and an acoustic control signal.

6. The metamaterial optical modulator of claim 1, wherein the change in the state of the one or more variable state elements includes one or more of a refractive index, an absorption, a reflectance, and a scattering state of the one or more variable state elements.

7. The metamaterial optical modulator of claim 1, wherein the change in the state of the one or more variable state elements comprises a change between two or more discrete states.

8. The metamaterial optical modulator of claim 1, wherein the change in the state of the one or more variable state elements comprises a change through a continuum of a range of states.

9. The metamaterial optical modulator of claim 1, wherein the one or more variable state elements include a photochromic material.

10. The metamaterial optical modulator of claim 1, wherein the one or more variable state elements include an electrochromic material.

11. The metamaterial optical modulator of claim 1, wherein the one or more variable state elements collectively change state based on the control signal received at the control input.

12. The metamaterial optical modulator of claim 1, wherein one or more of the variable state elements individually change state based on a control signal received at the control input.

13. The metamaterial optical modulator of claim 1, wherein the plurality of elements are characterized by a width from 1 nm to 10 μm and a thickness from 10 nm to 5 μm.

14. The metamaterial optical modulator of claim 1, wherein the plurality of elements is from about 25 elements to about 80,000 elements.

15. The metamaterial optical modulator of claim 1, wherein a topologic distribution of the variable state elements is selected using a multi-state topological algorithm.

16. The metamaterial optical modulator of claim 1, wherein array of discrete pixels is a tiled pattern of the plurality of elements.

17. The metamaterial optical modulator of claim 9, wherein the photochromic material is characterized by a plurality of states of one or more of refractive index, an absorption, a reflectance, and a scattering property.

18. The metamaterial optical modulator of claim 10, wherein the electrochromic material is characterized by a plurality of states of one or more of refractive index, an absorption, a reflectance, and a scattering property.

19. The metamaterial optical modulator of claim 1, wherein the plurality of elements further includes non-variable state elements as a portion of the discrete pixels.

20. A device comprising:

a plurality of optical waveguides; and a metamaterial optical modulator comprising an arrangement of a plurality of elements including one or more variable state elements, wherein the plurality of elements as arranged are optical elements configured to modulate one or more properties of a light via a change in a state of the one or more variable state elements based on a control signal to transmit the light between one combination of the plurality of optical waveguides in a first state of the one or more variable elements and another combination of the plurality of optical waveguides in a second state of the one or more variable elements, wherein the arrangement of the plurality of elements is an array of discrete pixels having a defined dimension, and the one or more properties of the light include one or more of an amplitude, a phase, a polarization or a direction of the light.

21. The device of claim 20, further comprising:

a first set of optical waveguides;

a second set of optical waveguides, and a plurality of metamaterial optical modulators disposed at different crossings between optical waveguides in the first set and optical waveguide in the second set.

22. The device of claim 20, further comprising a spatial-light modulator configured to split an incident beam into a plurality of beamlets of independent intensity or phase levels;

a plurality of metamaterial optical modulators; and a lens configured to focus respective ones of the plurality of beamlets as optical control signals on respective ones of the plurality of metamaterial optical modulators.

23. The device of claim 20, wherein:

the plurality of optical waveguides include an optical input waveguide and a plurality of optical output waveguides; and the light is modulated to transmit between the optical input waveguide and different ones of the plurality of optical output waveguides for different respective states of the one or more variable state elements.

24. The device of claim 20, wherein:

the plurality of optical waveguides include a plurality of optical input waveguides and an optical output waveguide; and the light is modulated to transmit between different ones of the plurality of optical input waveguides and the optical output waveguide for different respective states of the one or more variable state elements.

25. The device of claim 20, wherein:

the plurality of optical waveguides include a plurality of optical input waveguides and a plurality of optical output waveguides; and wherein the light is modulated to transmit from different combinations of the plurality of optical input waveguides to different combinations of the plurality of optical output waveguides for different respective states of the one or more variable state elements.

26. The device of claim 20, wherein the one or more properties of the light modulated by the plurality of elements as arranged further include one or more of an intensity, or a brightness.

27. The device of claim 20, wherein the plurality of elements are characterized by one or more dimension that are smaller than a wavelength of the light.

28. The device of claim 20, wherein the control signal includes an optical control signal, an electrical control signal, a thermal control signal, and an acoustic control signal.

29. The device of claim 20, wherein the change in the state of the one or more variable state elements includes one or more of a refractive index, an absorption, a reflectance, and a scattering state of the one or more variable state elements.

* * * * *